United States Patent
Sugaya et al.

(10) Patent No.: US 9,791,938 B2
(45) Date of Patent: Oct. 17, 2017

(54) SYSTEM AND METHODS OF CAMERA-BASED FINGERTIP TRACKING

(71) Applicants: Kiminobu Sugaya, Winter Park, FL (US); Andrew Sugaya, Winter Park, FL (US)

(72) Inventors: Kiminobu Sugaya, Winter Park, FL (US); Andrew Sugaya, Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 15/239,501

(22) Filed: Aug. 17, 2016

(65) Prior Publication Data

US 2016/0357267 A1    Dec. 8, 2016

Related U.S. Application Data

(63) Continuation of application No. 14/677,324, filed on Apr. 2, 2015, now abandoned, which is a continuation
(Continued)

(51) Int. Cl.
| | | |
|---|---|---|
| G06F 3/033 | (2013.01) | |
| G06F 3/01 | (2006.01) | |
| G06T 19/00 | (2011.01) | |
| G06F 3/041 | (2006.01) | |
| H04N 13/02 | (2006.01) | |
| G06K 9/00 | (2006.01) | |
| G02B 27/01 | (2006.01) | |
| G09B 21/00 | (2006.01) | |
| G06F 3/03 | (2006.01) | |
| G06F 3/042 | (2006.01) | |
| G06F 3/0346 | (2013.01) | |

(Continued)

(52) U.S. Cl.
CPC ........... *G06F 3/017* (2013.01); *G02B 27/017* (2013.01); *G02C 11/10* (2013.01); *G06F 3/005* (2013.01); *G06F 3/016* (2013.01); *G06F 3/0304* (2013.01); *G06F 3/0346* (2013.01); *G06F 3/0412* (2013.01); *G06F 3/0426* (2013.01); *G06K 9/00* (2013.01); *G06K 9/00355* (2013.01); *G06T 7/292* (2017.01); *G06T 19/006* (2013.01); *G09B 21/003* (2013.01); *H04N 13/0207* (2013.01); *H04N 13/0253* (2013.01); *G02B 2027/0178* (2013.01); *G06F 2203/04101* (2013.01); *G06T 2207/10016* (2013.01); *G06T 2207/30196* (2013.01); *G06T 2207/30244* (2013.01); *H04N 2101/00* (2013.01)

(58) Field of Classification Search
CPC ....................................................... G06F 3/017
USPC ............................................................ 345/156
See application file for complete search history.

(56) References Cited

U.S. PATENT DOCUMENTS

| | | |
|---|---|---|
| 5,767,842 A | 6/1998 | Korth |
| 5,887,069 A | 3/1999 | Sakou et al. |

(Continued)

*Primary Examiner* — Jason Olson
(74) *Attorney, Agent, or Firm* — Timothy H. Van Dyke; Beusse, Wolter, Sanks & Maire PLLC

(57) ABSTRACT

Systems and methods for camera-based fingertip tracking are disclosed. One such method includes identifying at least one location of a fingertip in at least one of the video frames, and mapping the location to a user input based on the location of the fingertip relative to a virtual user input device.

9 Claims, 8 Drawing Sheets

Related U.S. Application Data of application No. 13/494,975, filed on Jun. 12, 2012, now Pat. No. 9,001,036, which is a continuation-in-part of application No. 12/339,631, filed on Dec. 19, 2008, now Pat. No. 8,199,106.

(60) Provisional application No. 61/015,243, filed on Dec. 20, 2007.

(51) Int. Cl.
*G02C 11/00* (2006.01)
*G06F 3/00* (2006.01)
*G06T 7/292* (2017.01)
*H04N 101/00* (2006.01)

(56) References Cited

U.S. PATENT DOCUMENTS

| | | | |
|---|---|---|---|
| 6,088,018 A | 7/2000 | DeLeeuw et al. | |
| 6,147,678 A | 11/2000 | Kumar et al. | |
| 6,181,778 B1 | 1/2001 | Ohki et al. | |
| 6,388,657 B1 | 5/2002 | Natoli | |
| 6,477,239 B1 * | 11/2002 | Ohki | G09B 21/009 348/14.01 |
| 6,512,838 B1 | 1/2003 | Rafi et al. | |
| 7,542,586 B2 | 6/2009 | Johnson | |
| 7,859,519 B2 | 12/2010 | Tulbert | |
| 8,503,731 B2 * | 8/2013 | Lee | G06K 9/00355 382/106 |
| 9,001,036 B2 * | 4/2015 | Sugaya | G06F 3/0304 345/157 |
| 2002/0024675 A1 | 2/2002 | Foxlin | |
| 2003/0052963 A1 | 3/2003 | Junkins et al. | |
| 2003/0069997 A1 | 4/2003 | Bravin et al. | |
| 2004/0143430 A1 * | 7/2004 | Said | G06F 17/218 704/2 |
| 2007/0120996 A1 | 5/2007 | Boillot | |
| 2007/0286163 A1 | 12/2007 | Oka et al. | |
| 2009/0012788 A1 * | 1/2009 | Gilbert | G10L 21/06 704/235 |
| 2009/0160767 A1 | 6/2009 | Sugaya et al. | |
| 2010/0299150 A1 | 11/2010 | Fein et al. | |
| 2011/0301934 A1 | 12/2011 | Tardif | |
| 2013/0314303 A1 * | 11/2013 | Osterhout | G06F 3/005 345/8 |

\* cited by examiner

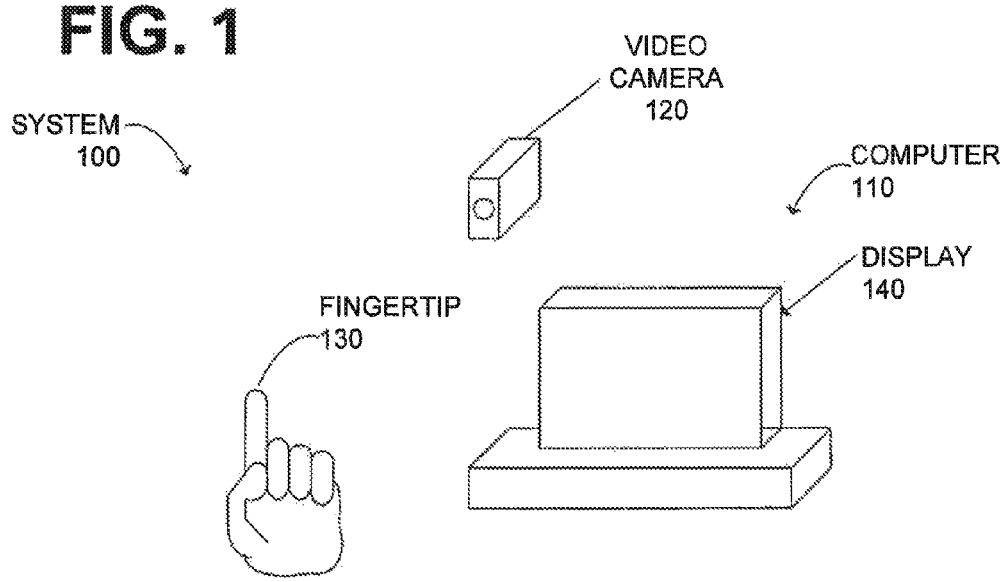
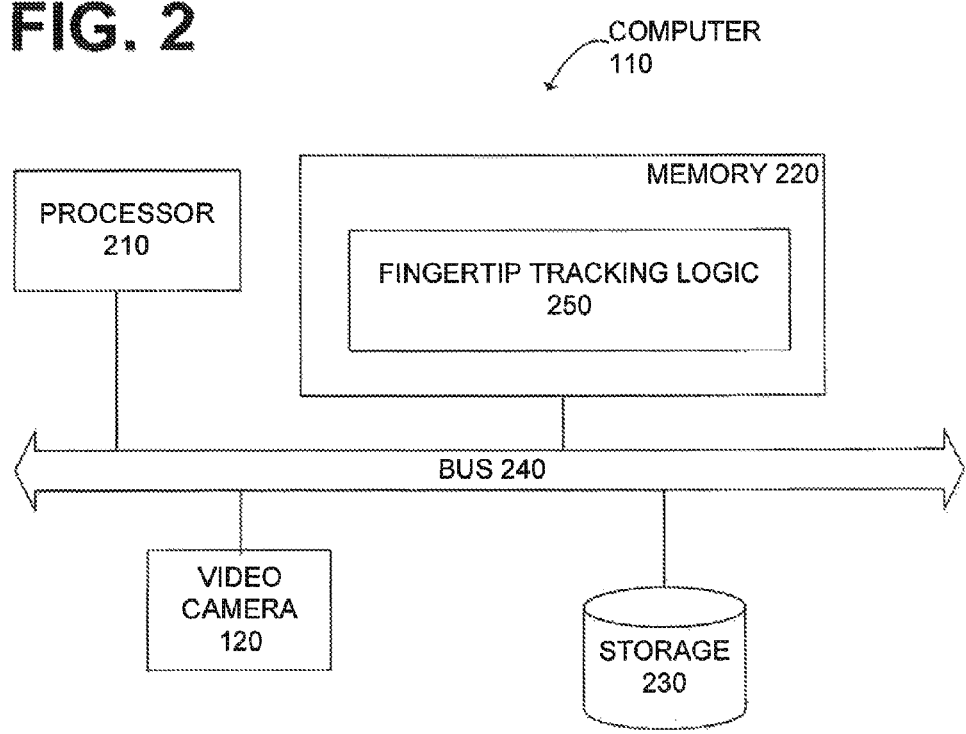

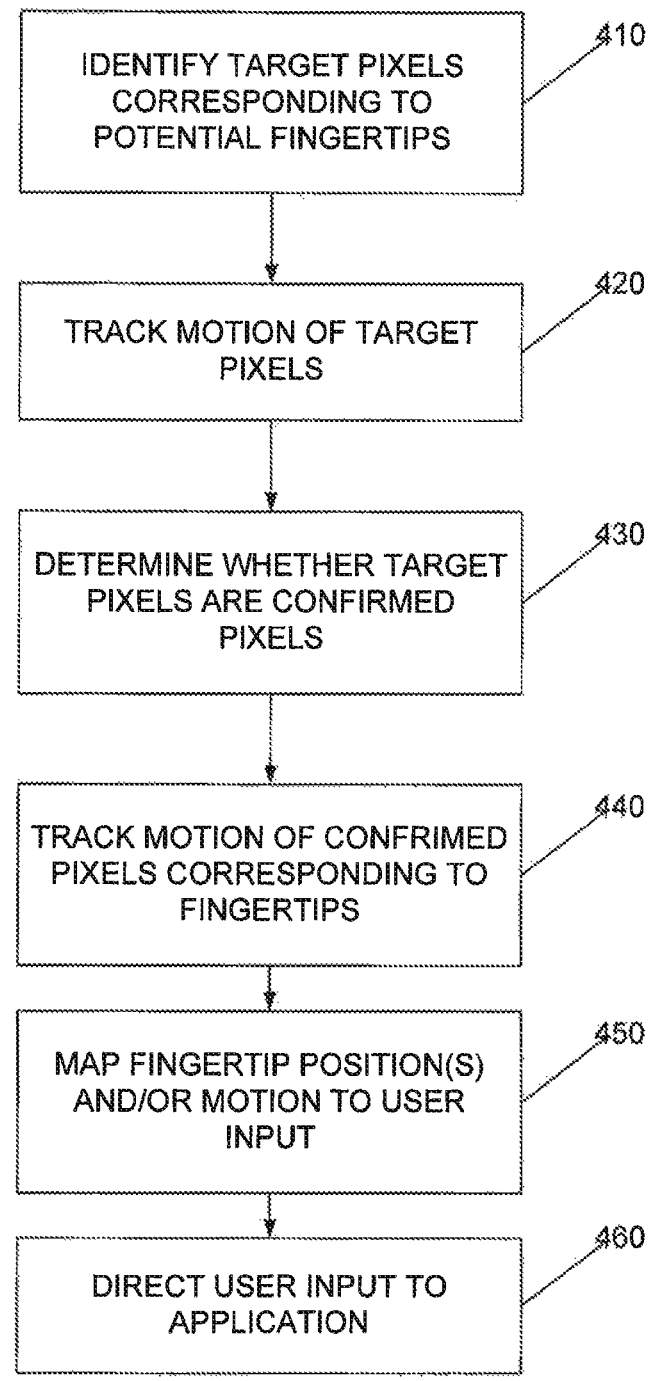

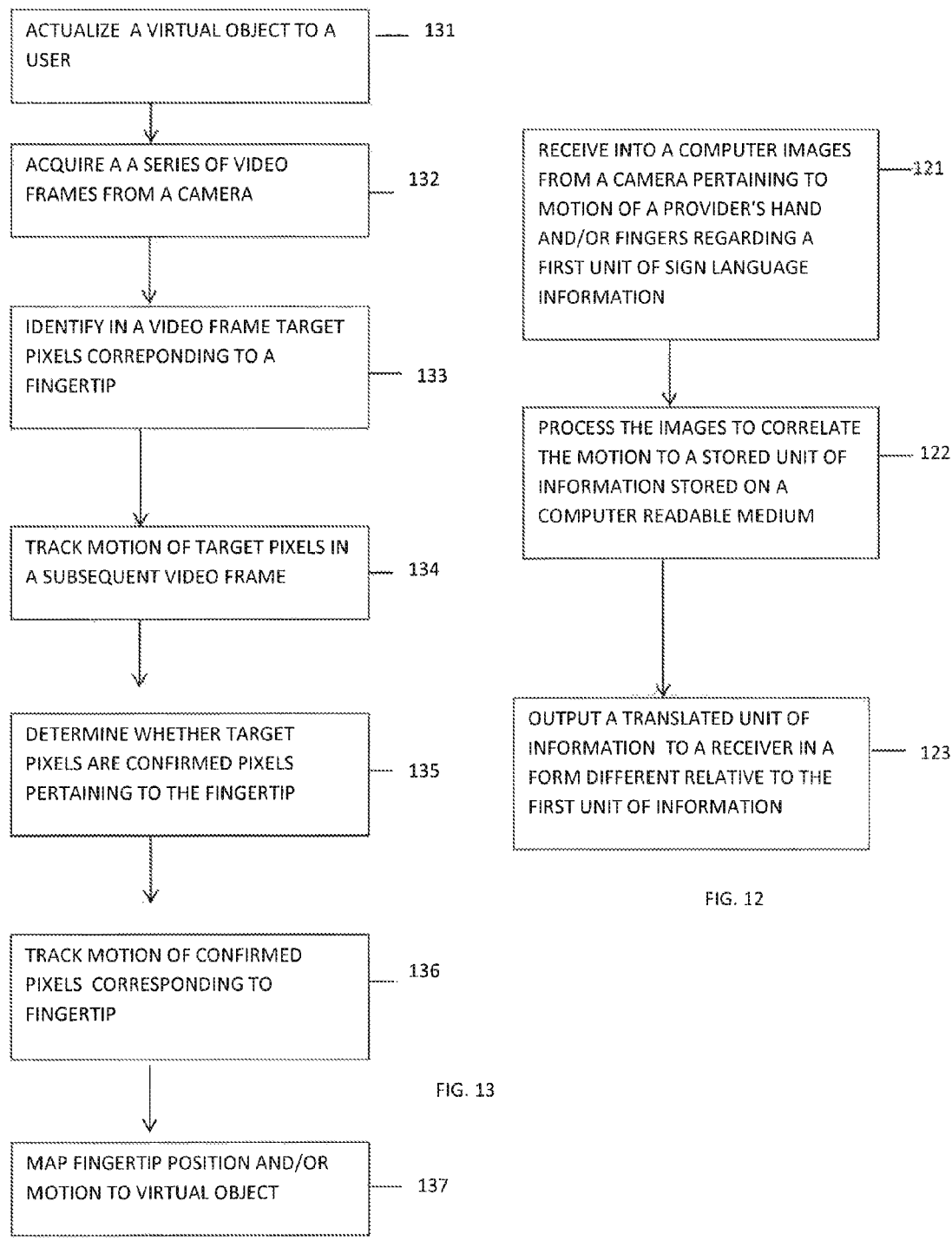

SYSTEM AND METHODS OF CAMERA-BASED FINGERTIP TRACKING

CROSS REFERENCE TO RELATED APPLICATIONS

This application is a continuation of U.S. patent application Ser. No. 14/677,324 filed on Apr. 2, 2015, which is a continuation of U.S. patent application Ser. No. 13/494,975 filed on Jun. 12, 2012 and issued as U.S. Pat. No. 9,001,036 on Apr. 7, 2015, which is a continuation-in-part of U.S. patent application Ser. No. 12/339,631 filed Dec. 19, 2008 and issued as U.S. Pat. No. 8,199,106 on Jun. 12, 2012, and which further claims priority to U.S. Provisional Application Ser. No. 61/015,243, filed Dec. 20, 2007; all of which are incorporated herein by reference in their entirety.

TECHNICAL FIELD

The present disclosure relates to visual tracking of objects, and more specifically, to camera-based tracking of fingertips.

BACKGROUND

Conventional mechanisms for user input to computers include keyboards and pointing devices. Touch-sensing displays are also used, but these displays are expensive, and a large size touch-sensing display requires more exertion from the user to perform the same action. Furthermore, a touch-sensing display allows fingertip movement only on a flat surface, and cannot recognize finger tip movement in free space. Fingertip tracking in free space has been accomplished by the use of infrared, and through combination of lasers and steering mirrors. But these methods require complicated, expensive equipment and prove to be impractical. Methods for tracking fingers in free space with ordinary cameras have been developed, but fingers have less mobility and dexterity as compared to fingertips.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 1 depicts one embodiment of a system for camera-based fingertip tracking.

FIG. 2 is a hardware block diagram of one embodiment of the computer from FIG. 1.

FIG. 4 is a flowchart of the operation in one embodiment of the fingertip tracking logic from FIG. 2.

FIG. 12 depicts a flow chart of operation which can be used to translate sign language information.

FIG. 13 depicts a flow chart of operation which can be used to manipulate a virtual object.

SUMMARY

Figure 3:
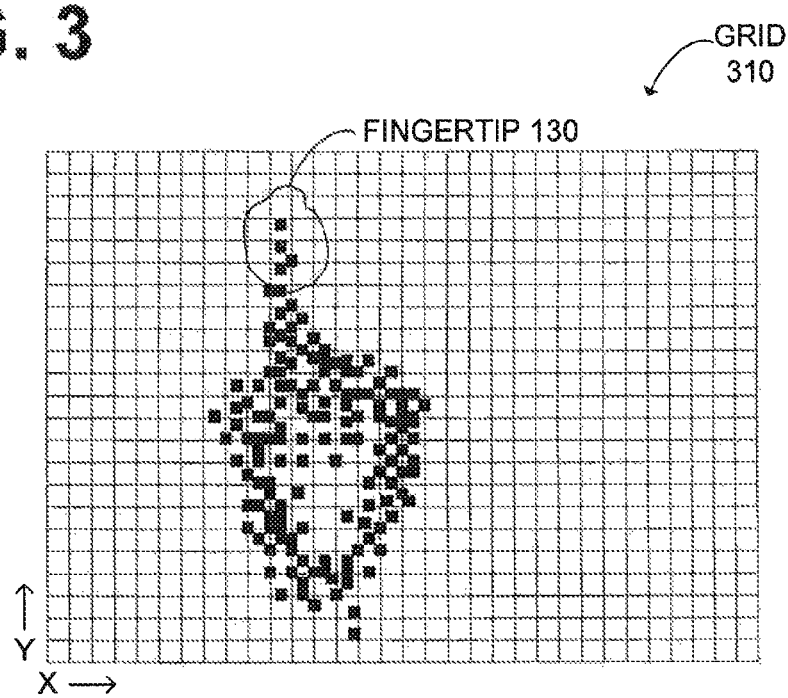
FIG. 3 illustrates a pixel grid utilized by the fingertip tracking logic from FIG. 2.

Systems and methods for camera-based fingertip tracking are disclosed. One such method includes identifying at least one location of a fingertip in at least one of the video frames, and mapping the location to a user input based on the location of the fingertip relative to a virtual user input device. One such system includes a video camera, memory and a processor. The video camera is configured to produce a series of video frames. The memory is configured to store program code, and the processor is programmed by the program code to: examine at least one of the video frames to identify at least one location of a fingertip within the video frame; and map the location to a one of a plurality of predetermined user inputs, based on the location of the fingertip relative to a virtual user input device.

DETAILED DESCRIPTION

The embodiments disclosed herein provide systems and methods for camera-based fingertip tracking. In one such embodiment, a video camera captures motion of one or more fingertips in a series of video frames. Software analyzes the video frames to identify a fingertip location and/or movement in the video frames. Based on location of the fingertip relative to a virtual user input device, the software maps the fingertip to a virtual input such as a key or mouse location, and provides this input to an application.

FIG. 1 depicts one embodiment of a system for camera-based fingertip tracking. System 100 includes a computer 110 in communication with a digital video camera 120. Video camera 120 captures digital images in its field of view, and fingertip tracking logic 250 (see FIG. 2) analyzes series of captured images to track the location and motion of fingertips. Logic 250 then maps the fingertip location and/or motion to data that is usable by an application running on computer 110. In some embodiments, logic 250 maps fingertip location and/or motion to a key, a combination of keys, a mouse click, or a mouse movement.

In the example of FIG. 1, video camera 120 is located near computer 110, with at least one fingertip 130 positioned in the field of view of video camera 120. However, other locations for video camera 120 are possible, as long as video camera 120 is in communication with computer 110. In this example embodiment, video camera 120 is separate from computer 110, but in other embodiments video camera 120 is integrated with computer 110.

Also shown in FIG. 1 is a display 140 (optional). In some embodiments, computer 110 presents a keyboard representation on display 140. The user points to locations on the keyboard representation, fingertip tracking logic 250 tracks the location and motion of fingertips relative to this keyboard representation, then maps the location and/or motion to keyboard locations. In other embodiments, computer 110 projects a keyboard representation onto a surface. The user's fingers are not required to touch the display or the surface in these embodiments. Instead, the user's interaction is with the representation of the keyboard rather than a physical object, since fingertip tracking logic 250 detects fingertip location and tracks fingertip motion rather than touch or contact.

FIG. 2 is a hardware block diagram of one embodiment of computer 110. Computer 110 contains a number of components that are familiar to a person of ordinary skill in the art. FIG. 2 omits a number of conventional components, known to those skilled in the art, that are not necessary to explain the operation of the computer.

Components of computer 110 include a processor 210, memory 220, and storage 230 (e.g., hard disk, flash RAM, flash ROM, EEPROM, etc.). These components are coupled via a bus 240. Bus 240 may include multiple types of buses such as a dedicated memory bus, a combined memory-10 bus, and/or one or more peripheral buses (e.g., universal serial bus, IEEE 1394, etc.). The computer is also in communication with video camera 120. In the example of FIG. 2, video camera 120 is connected via bus 240. However, in other embodiments, computer 110 includes a network interface (not shown), and video camera 120 communicates with computer 110 over a network (e.g., Ethernet, WiFi, Internet, etc.).

In some embodiments, fingertip tracking logic 250 is implemented as executable instructions stored in memory 220 and executed by processor 210. In other embodiments, fingertip tracking logic 250 is implemented in hardware logic (e.g., an application-specific integrated circuit).

Logic 250 is described herein as residing within the same computer 110 which contains video camera 120. However, a person of ordinary skill in the art should appreciate that the functionality of these components could be distributed in other ways. The operation of fingertip tracking logic 250 will now be described in conjunction with FIGS. 3-6.

Fingertip tracking logic 250 analyzes video frames captured from video camera 120, where each frame is processed as a pixel grid 310, shown in FIG. 3. At least one portion of the pixels within pixel grid 310 are identified by logic 250 as a fingertip 130 (see FIG. 1). In some embodiments, logic 250 identifies multiple fingertips 130, each corresponding to a different portion of pixel grid 310.

FIG. 4 is a flowchart of the operation in one embodiment of fingertip tracking logic 250. A positioning stage (block 410) compares each pixel in a current frame with the same pixlin the previous frame. If the grayscale (or color, if color is used) of the pixel has changed significantly, the current pixel is then compared with other neighboring pixels. A pixel with changed grayscale that is also brighter than its surroundings it is considered to be a "target" pixel since fingertip 130 tends to be brighter than its surrounding area. Determining that a particular target pixel may correspond to fingertip 130 thus locates the potential fingertip's location in space. Various embodiments may track different numbers of fingertips.

A tracking stage (block 420) tracks the motion of the target pixel by removing the background, averaging the grayscales of corresponding pixels in the two frames, and determining motion by subtracting the pixel grayscale from the second frame.

Having processed two frames (current and previous) later frames are similarly analyzed, but with a focus on target pixels (block 430). Instead of all pixels, only target pixels are compared with the same pixel in the previous frame, then with neighboring pixels. If a target pixel once again meets the target criteria in these later frames, the target pixel then becomes a "confirmed" pixel, which most likely represents a fingertip.

Motion of these "confirmed" pixels, corresponding to fingertips, are tracked (block 440). As in block 420, the tracking is performed by removing the background, averaging the grayscales of corresponding pixels in the two frames, and determining motion by subtracting the pixel grayscale from the second frame.

Once fingertips have been identified via confirmed pixels, this embodiment of fingertip tracking logic 250 maps fingertips 130 from locations within pixel grid 310 to user input (block 450), and directs the user input to applications running on the computer 110 (block 460). The techniques described herein allow tracking of all fingertips independently and in free space, which permits greater flexibility and provides more information from gestures.

Figure 5:
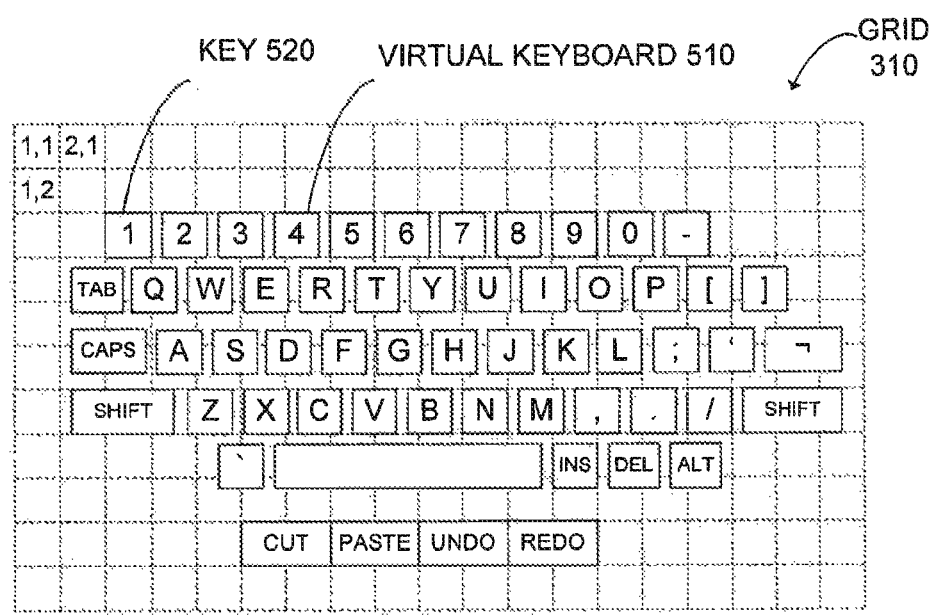
FIG. 5 illustrates the operation of the mapping block from FIG. 4.

FIG. 5 illustrates the operation of mapping block 450 in more detail. At least a portion of pixel grid 310 corresponds to a virtual keyboard 510. Each key 520 of virtual keyboard 510 corresponds to a set of pixel locations within grid 310. In the example of FIG. 5, the number "1" key (310) is located at grid location [3,3]. This embodiment of fingertip tracking logic 250 therefore maps fingertip 130 to the "1" key on keyboard 510 when that fingertip 130 is located at location grid location [3,3]. In some embodiments, a key mapping is not determined until a fingertip 130 has stayed in the same location for a specific period of time.

Other fingertip positions are similarly mapped to other locations on virtual keyboard 510. The virtual keyboard concept can be extended to handle key sequences on a physical keyboard as virtual keys. For example, the Ctrl-X key sequence, which represents a "Cut" command in some user interfaces, can be represented as a single "Cut" key on virtual keyboard 510.

Another example of mapping fingertip motion to user input treats fingertip motion as movement of a pointing device (e.g.; mouse, trackball). Thus, the software converts motion of the index fingertip in free space to motion of the index finger on the pixel grid, which is mapped to moving a pointer on a virtual surface. One embodiment uses a special location on the grid to represent mouse actions such as a button click or double click, so that moving the index finger to this location acts as a click or double click. In some embodiments, the mouse action is not activated until a fingertip 130 has stayed in the same click or double click location for a specific period of time.

Figure 6:
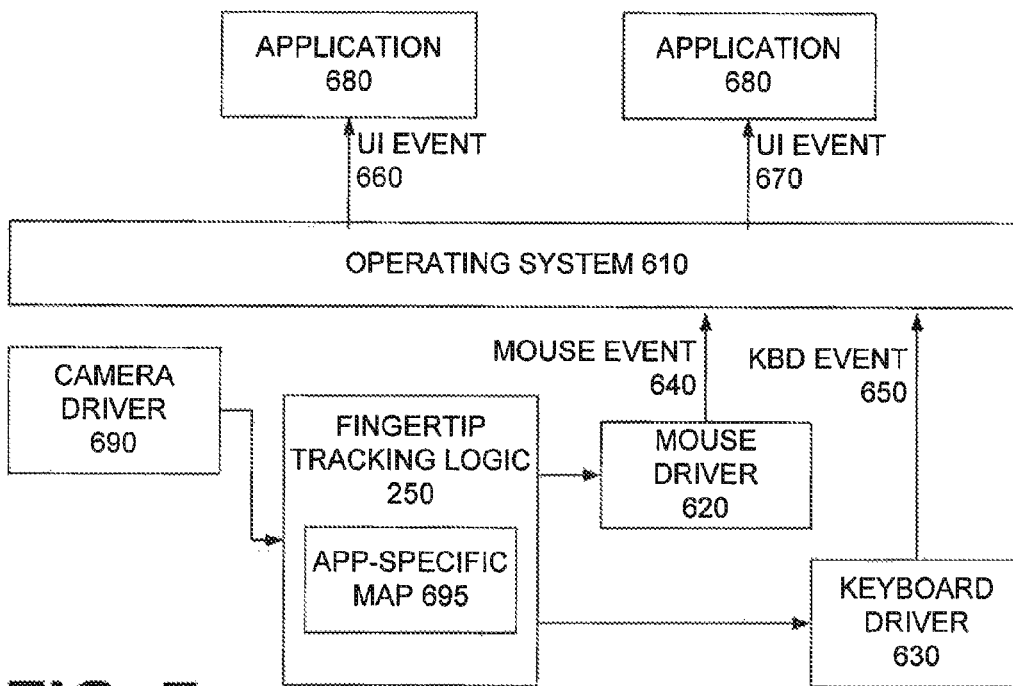
FIG. 6 depicts one example architecture which can be used to implement the fingertip tracking logic from FIG. 2.

FIG. 6 depicts one example architecture which can be used to implement fingertip tracking logic 250. Device drivers for particular input devices provide low-level events to an operating system 610. This example includes a mouse driver 620 and a keyboard driver 630, which provide mouse events 640 and key events 650 to operating system 610. Operating system 610 then provides user interface events 660, 670 to various applications 680 executing on computer 110. Typically, operating system 610 translates from low-level events to corresponding user interface events, though this translation may not be present in all embodiments. For example, the key sequence "Control-A" may be received by operating system 610 as two keystroke events, but translated into a single user interface event for the application.

A camera driver 690 interfaces to the video camera 120 of FIG. 1, and fingertip tracking logic 250 retrieves frames from camera driver 690. Logic 250 determines fingertip locations and/or motion, then translates location and motion information (relative to the frame or grid) into user input. (This operation was described earlier in connection with FIGS. 3-5.) This user input, in the form of mouse-specific or keyboard-specific data, is provided to mouse driver 620 and keyboard driver 630 (respectively). Thus, in this example architecture fingertip tracking logic 250 operates as a mouse and a keyboard from the perspective of the mouse and keyboard drivers. Some embodiments of fingertip tracking logic 250 may also use an application-specific mapping 695 (e.g.; specific to a word processor, spreadsheet, etc.)

Figure 7:
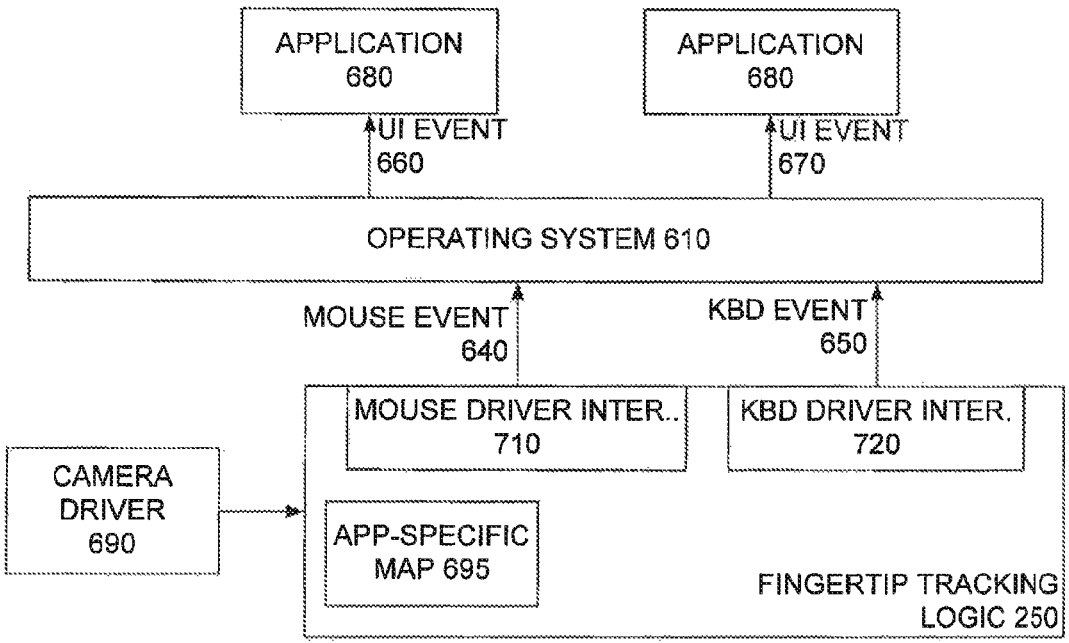
FIG. 7 depicts another example architecture which can be used to implement the fingertip tracking logic from FIG. 2.

FIG. 7 depicts another example architecture which can be used to implement fingertip tracking logic 250. This architecture is similar to that of FIG. 6, but fingertip tracking logic 250 itself operates as a mouse driver (by providing a mouse driver interface 710) and as a keyboard driver (by providing a keyboard driver interface 720). That is, fingertip tracking logic 250 provides the same interfaces to operating system 610 that mouse driver 620 and keyboard driver 630 do.

Embodiments of fingertip tracking logic 250 can control robots from a remote location, which may be used in many different fields and applications. One example is medical diagnostic and surgical procedures. Another example is military applications, for example a targeting system. The techniques described herein can be extended through the use of multiple cameras to implement a three-dimensional tracking system, in which fingertip movement is tracked in three coordinate planes.

In some embodiments, system 100 is located in an operating room and used by a person such as a surgeon. Such embodiments include a display which displays, in the field of view of video camera 120, the output of an application such as an image viewer. The user interacts with the image viewer and manipulates the displayed image (e.g., a diagnostic image of the patient) by pointing. Using the techniques described above, fingertip tracking logic 250 identifies the pointed-to portions of the image, and translates this to input provided to the image viewer. Other types of applications are also contemplated (e.g., web browser, file manager, etc.).

Since the user controls the application without touching a solid surface, the sterility of the operating room is preserved. A variation on this embodiment utilizes gloves which include a marker (e.g., color, fluorescent, etc.) in the fingertip area. In this embodiment, positioning and tracking is simplified, while the mapping and injection of input into an application remains the same.

Figure 8:
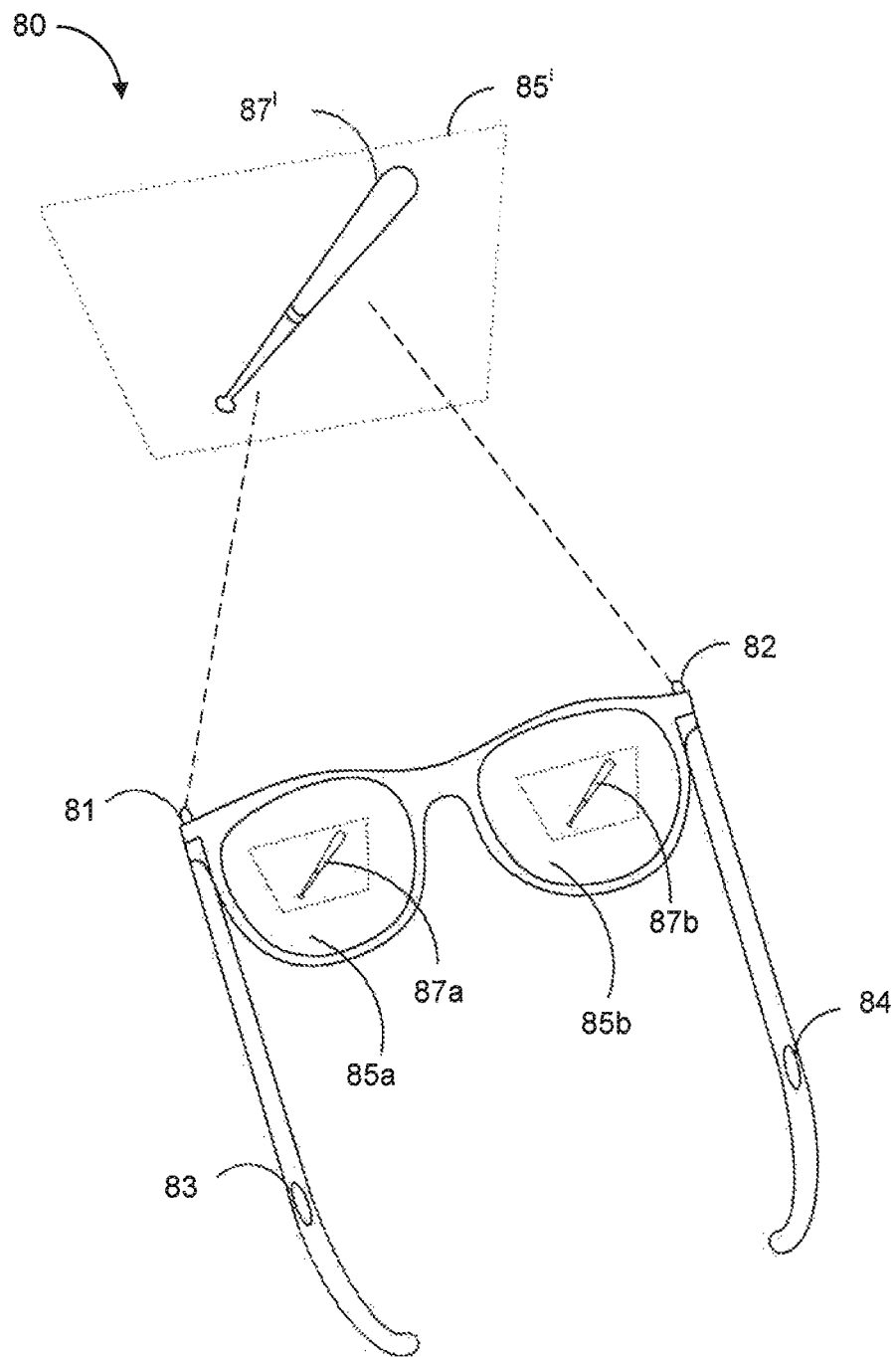
FIG. 8 depicts an eyewear device embodiment that projects an image viewable to the user and which allows user input to interact with the image.

In another embodiment, provided is an eyewear device 80 that is shown in FIG. 8. The eyewear device 80 displays an image field 85' to a user that is generated on lenses 85a,b. A virtual object 87' (such as a bat) is displayed in the image field, which is also generated on the lenses as 87a,b. This image may provided in a 3D or 2D perspective. The eyewear device 80 includes a first camera 81 and second camera 82 located on the corners of the frame. The eyewear device 80 is also shown with a processor 83 and power supply 84, which would make the remote and wireless. A user wearing the eyewear device 80 can manipulate the virtual object 87' by interaction with the user's hand(s), finger(s), and/or other portion of the user's body, such as according to the programming described herein.

Figure 9:
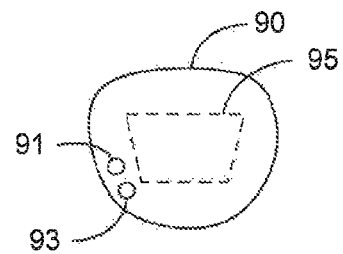
FIG. 9 illustrates an alternative eyewear device embodiment in the form of a contact lens.

In a further embodiment as shown in FIG. 9, what is provided is a contact lens 90 that generates an image 95. The lens 90 also includes a camera 91 and power source 93. Alternatively, the contact lens is worn in conjunction with at least one camera positioned elsewhere on the user.

Figure 10:
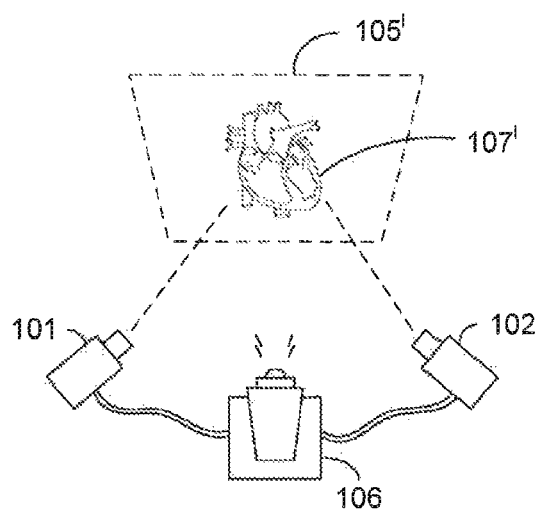
FIG. 10 illustrates a system embodiment that utilizes a holographic image.

According to a further embodiment, provided is a system shown in FIG. 10 that includes a holographic generator 106, that produces a holographic image field 105'. The image field 105' displays a virtual object 107', such as a heart as shown. The system includes at least one camera. As shown, the system includes a first and second camera 101, 102 which can track the motions of a user's hand; finger(s), fingertips, or other portion of the user's body.

According to another embodiment, provided is a sign language translator system. Using FIG. 11 as one reference, the system 110 involves the input of images from an information provider's body part (such as a hand, finger, and/or fingertip) 113 acquired through one or more cameras 111, 112 and inputted into a computer 114. The computer 114 is programmed to process, typically by a processor 116, the images by correlating the input of information with a unit of information stored on a computer readable medium 115, either in the computer 114, or in communication with the computer 114. The stored information is conveyed to a receiver 117 in a form different from that provided by user 113. For example, the information conveyed to the receiver may be visual information pertaining to correlative image or words pertaining to the unit of information intended to be conveyed by the user 113. By way of example, the user may provide hand/finger/body part motion pertaining to a first sign language to convey a unit of information pertaining to an "apple". The output of information to the receiver may be a visual image of an apple, a spoken word "apple", tactile information (such as Braille) or images of hand/finger motion pertaining to a sign language word for "apple" but in a different sign language version. Sign languages have different versions just like written or spoken languages are different. For example, the English version sign language motion for "apple" may be processed to produce an image for a Spanish version sign language hand/finger/bodypart motion. Thereby, the embodiment provides the ability to translate one version of sign language into another version of sign language, and/or translate sign language into an image or written form understandable by one who does not necessarily know sign language.

Figure 11:
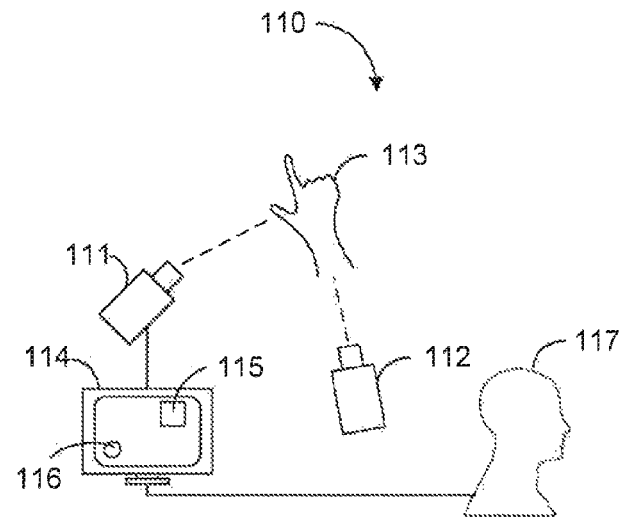
FIG. 11 illustrates a system for translating sign language information.
Figure 14:
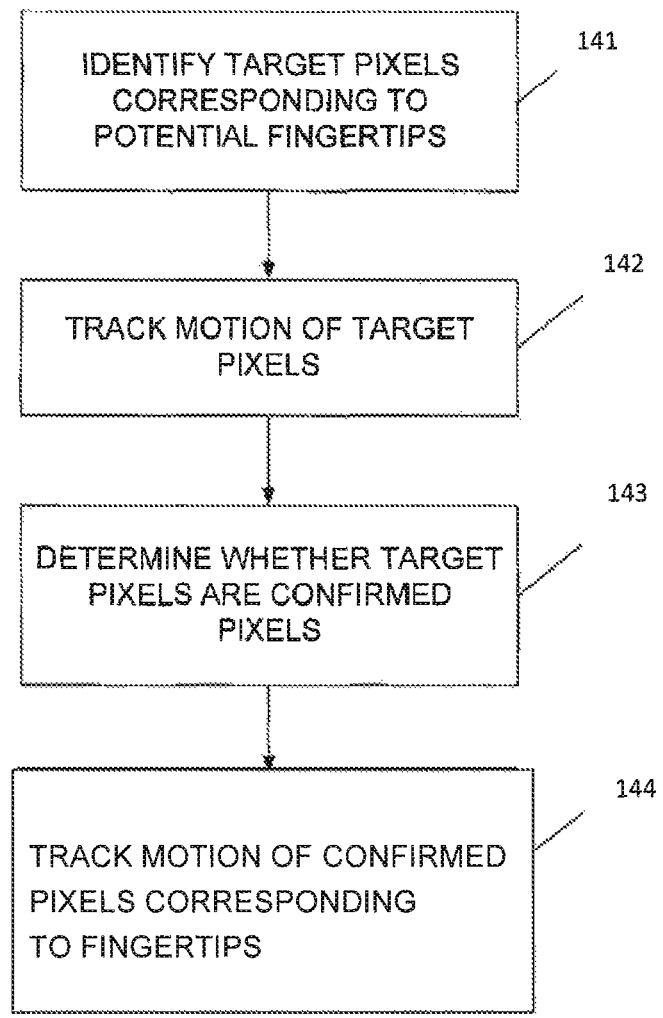
FIG. 14 depicts flow chart of operation for identifying and tracking body part information in video images.

According to a specific embodiment, with reference to FIG. 12, a computer such as 114 from FIG. 11, is programmed to 121—receive images from a camera pertaining to motion of a providers hand and/or fingers regarding a first unit of sign language information; 122—process the images to correlate the motion to a stored unit of information stored on a computer readable medium; and 123 output a translated unit of information to a receiver in a form different from the first unit of information. In a more specific embodiment, the computer 114 is programmed to identify from the images pixels corresponding to the hand and/or fingertip(s) and tracking motion of the hand/or fingertip(s) based on pixels in the images. For example, as illustrated in the block diagram of FIG. 14, the computer is programmed to 141—identify target pixels corresponding to potential fingertips; 142—track motion of target pixels; 143—determine whether target pixels are confirmed pixels; and 144—track motion of confirmed pixels corresponding to fingertips. It is noted that reference to "fingertips" in FIG. 14 is intended to pertain to a hand, finger, fingers, fingertip and/or fingertips depending on the application.

In a further embodiment, provided is a system of manipulating a virtual object. In reference to block diagram of FIG. 13, the system includes a computer programmed to 131—actualize a virtual object to a user; 132—acquire a series of video frames from a camera; 133—identify in a video frame target pixels corresponding to a fingertip; 134—track motion of target pixels in a subsequent video frame; 135—determine whether target pixels are confirmed pixels pertaining to the fingertip; 136—track motion of confirmed pixels corresponding to fingertip; and 137—map fingertip position and/or motion to virtual object. It is noted that reference to "fingertip" in FIG. 14 is intended to be broad and may pertain to a hand, finger, fingers, fingertip, fingertips and/or other body part depending on the application. The actualizing of an image may be in the presentation of the image to a user via a screen, lens; holographic image, and the like.

In another embodiment, a system is provided that processes image information, correlates the image information with a stored unit of information, and outputs the stored unit of information in a form different to than the original inputted form. The output of information may take a number of different forms, including, but not limited to, aural, visual, electrical or neuroelectrical information interpretable by the receiver.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but not limited to) a portable computer diskette. Specific examples using optical technology include (but are not limited to) an optical fiber and a portable compact disk read-only memory (CD-ROM).

What is claimed is:

1. A method of translating sign language, the method comprising
   receiving a series of images from a camera pertaining to a motion of a provider's hand, finger, fingertip, and/or arm corresponding to a first unit of sign language information;
   identifying from the images pixels corresponding to the hand, finger, fingertip and/or arm;
   tracking motion of the hand, finger, fingertips and/or arm based on the pixels in the images;
   processing the images to correlate the motion of the first unit of sign language information to a stored unit of sign language information of a different sign language type stored on a computer readable medium; and
   outputting the stored unit of information of a different sign language type to a receiver, wherein said outputting comprises providing image information comprising motion of a hand, finger, fingertip and/or arm pertaining to sign language of a type different than said first unit of information.

2. The method of claim 1, wherein said outputting further comprises providing an aural signal.

3. The method of claim 2, wherein said aural signal comprises speaking a word to which the first unit of information pertains.

4. The method of claim 1, wherein said outputting further comprises providing a word in text form.

5. The method of claim 1, wherein said outputting further comprises providing a word in tactile form.

6. The method of claim 5, wherein said tactile form is Braille.

7. The method of claim 1, wherein said outputting comprises further displaying a visual image of an object to which the first unit of sign language information pertains.

8. A system for translating sign language, the system comprising a camera in communication with a computer, the computer comprising a computer readable media and being programmed to receive video images of a unit of sign language motion, identifying from the images pixels corresponding to the hand, finger, fingertip and/or arm; tracking motion of the hand, finger, fingertips and/or arm based on the pixels in the images; and correlating the sign language motion to unit of information stored on the computer readable media; and an output device for outputting an output unit of information, wherein the computer is programmed to output the output unit of information via said output device, and wherein said output unit of information comprises providing image information comprising motion of a hand, finger, fingertip, and/or arm pertaining to sign language of a type different than said unit of sign language motion.

9. The system of claim 8, wherein said output device comprises a speaker, display, or Braille machine.

* * * * *